United States Patent [19]
Yamanaka

[11] Patent Number: 6,109,471
[45] Date of Patent: Aug. 29, 2000

[54] THERMAL VACUUM BOTTLE

[75] Inventor: Shigehiro Yamanaka, Osaka, Japan

[73] Assignee: Peacock Company, Limited, Osaka, Japan

[21] Appl. No.: 09/246,224

[22] Filed: Feb. 8, 1999

[51] Int. Cl.$^7$ .............................. B67D 5/54; F04B 43/02
[52] U.S. Cl. .............................. 220/592.18; 220/592.27; 220/288; 220/327; 222/209
[58] Field of Search ..................... 220/288, 293, 220/295, 296, 327, 254, 255, 256, 259, 592.27, 592.17, 529.16, 592.18; 99/312; 222/401, 400.8, 131, 209, 556, 393.1, 385, 321.8, 321.7, 321.1

[56] References Cited

U.S. PATENT DOCUMENTS

| | | | |
|---|---|---|---|
| 3,974,933 | 8/1976 | Toth et al. | 220/327 X |
| 4,116,366 | 9/1978 | Takenakashima et al. | 222/209 X |
| 4,238,054 | 12/1980 | Chen | 222/209 |
| 4,310,104 | 1/1982 | Takatsuki | 222/401 X |
| 4,320,856 | 3/1982 | Stewart et al. | 220/592.27 X |
| 4,506,812 | 3/1985 | DeFreitas | 222/401 X |
| 4,550,864 | 11/1985 | Tarozzi et al. | 222/400.8 X |

FOREIGN PATENT DOCUMENTS 55-75600  6/1980  Japan ..................................... 222/401

*Primary Examiner*—Nathan J. Newhouse
*Attorney, Agent, or Firm*—Moonray Kojima

[57] ABSTRACT

A thermal pot comprising a barrel member; a vacuum vessel disposed within the barrel member and comprising a neck member; a lid mounted on an upper side 66 the neck member; a screw fastening device provided between the barrel member and the neck member; and fixing device for fixing the state of the screw fastening with the screw fastening device by inserting the neck member in the barrel member horizontally at a part of the neck member and barrel member which are overlapped, thereby to prevent the screw device from being exposed so that the lid is securely fastened while the overall design is improved.

3 Claims, 5 Drawing Sheets

THERMAL VACUUM BOTTLE

BACKGROUND OF THE INVENTION

1. Field of the Invention

The present invention relates to a pot for keeping liquids warm, more specifically to a pot the barrel portion of which having a heat insulating capacity constituting the main body is formed with a metallic vacuum bottle.

2. Description of the Prior Art

In addition to portable pots, there are other types of pot such as table pot, etc. in which the metallic vacuum bottle itself is used as the barrel member. In this type of pot, a plurality of screws are used from the inside of the neck member to the barrel member under it, to fasten the barrel member to the neck member made of a resin.

However, this fastening structure presents a problem that, when the lid member attached in axle to the neck member is opened, the head of the screw is fully visible, making the pot look rather poor in design, and a problem of hygiene because dirt is liable to adhere to the screw part. Moreover, a problem with table pot was that the state of fixing is not sufficiently solid because, since a handle is provided on the neck member, a load in separating direction is exerted between the neck member having the handle and the barrel member storing the liquid, and this load is substantially supported by said screws only.

SUMMARY OF THE INVENTION

The main objective of the present invention is to provide a pot with a good design feeling and a solid state of fixing.

The means for achieving that objective is a pot realized by fixing a neck member, having an openable lid member on the upper side, on a neck member, characterized in that said barrel member is formed with a metallic vacuum bottle, that screw fastening means for mutual screw fastening is provided between the barrel member and the neck member, and that the pot is provided with fixing means for fixing the state of screw fastening with said screw fastening means, by inserting either one of said barrel member or neck member in the other.

Said screw fastening means shall preferably be composed of male screw member fixed on the top face of the barrel member and a female screw member formed on the bottom face of the neck member and screw connected to said male screw member, and it is also recommended to form a partial screw on said male screw member.

Moreover, said fixing means shall preferably be composed of a standing piece fixed on the top face of the barrel member and rising upward and a fixing screw for screw fastening the neck member, from the outer side face, horizontally to said standing piece.

Namely, according to the above-described construction, to fix the barrel member constituted with a metallic vacuum bottle to the neck member, those two members are screw connected to each other with screw fastening means, and then that screw fastened state is further fixed by fixing means. The screw fastening means, which does not use any screw in separate body, does not expose the screw head as was the case with conventional products, and the fixing means, which simply fixes a state of screw fastening by screw fastening means, only needs to be screw fastened horizontally to the lapped portion of the neck member and the barrel member, for example, thus making it possible to prevent the screw head from being exposed to the inside of the pot as in the case of a conventional product.

For that reason, it becomes possible to solve the problems of defective design feeling and hygiene.

Furthermore, the double fixing by screw fastening means and fixing means provides a solid state of fixing.

In the case where a pot is constructed as defined in claim 2, the screw connection between the barrel member having a male screw member and the neck member having a female screw member can be made with a small amount of turning, easily and quickly even with a pot of large diameter.

In the case where a pot is constructed as defined in claim 3, the problem of hygiene can be solved, without exposing the head of the fixing screw to the inside of the pot. In addition, the operation is easier compared with the case of a conventional type in which the screw was screw connected to the inside of the neck member having a lid member.

DESCRIPTION OF THE PREFERRED EMBODIMENT

An embodiment of the present invention will be described in detail hereafter by referring to drawings.

Figure 2:
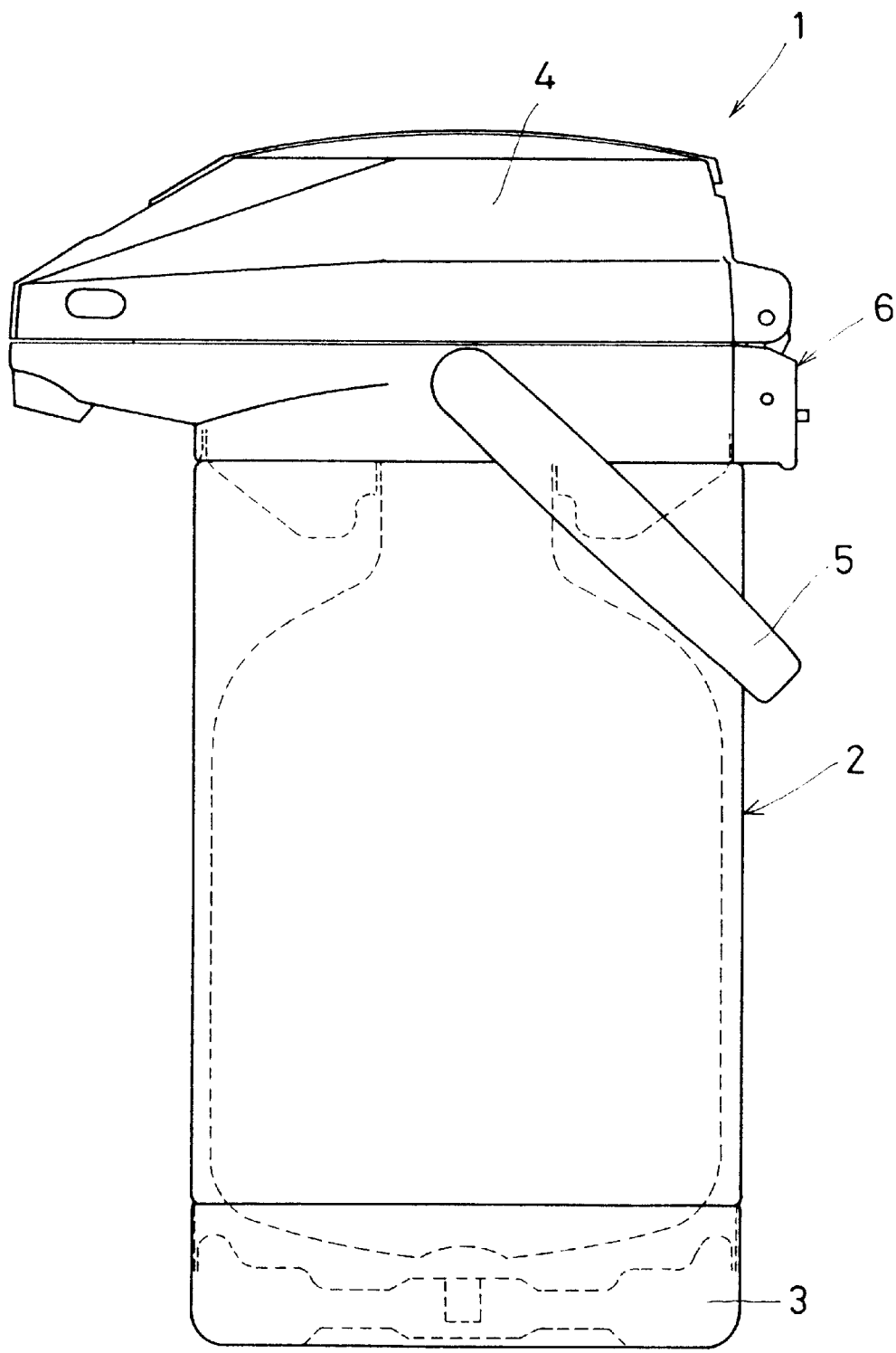
FIG. 2 is a side view of the pot.

FIG. 2 is a side view of the pot 1, in which the barrel portion (barrel member 2) constituting the main body is formed with a metallic vacuum bottle. At the vacuumed bottom part of this barrel member 2 is fixed a plate-like bottom member 3 by means of welding, etc., while at the top part is integrally fixed a neck member comprising an openably mounted lid member 4 and a handle 5.

Figure 1:
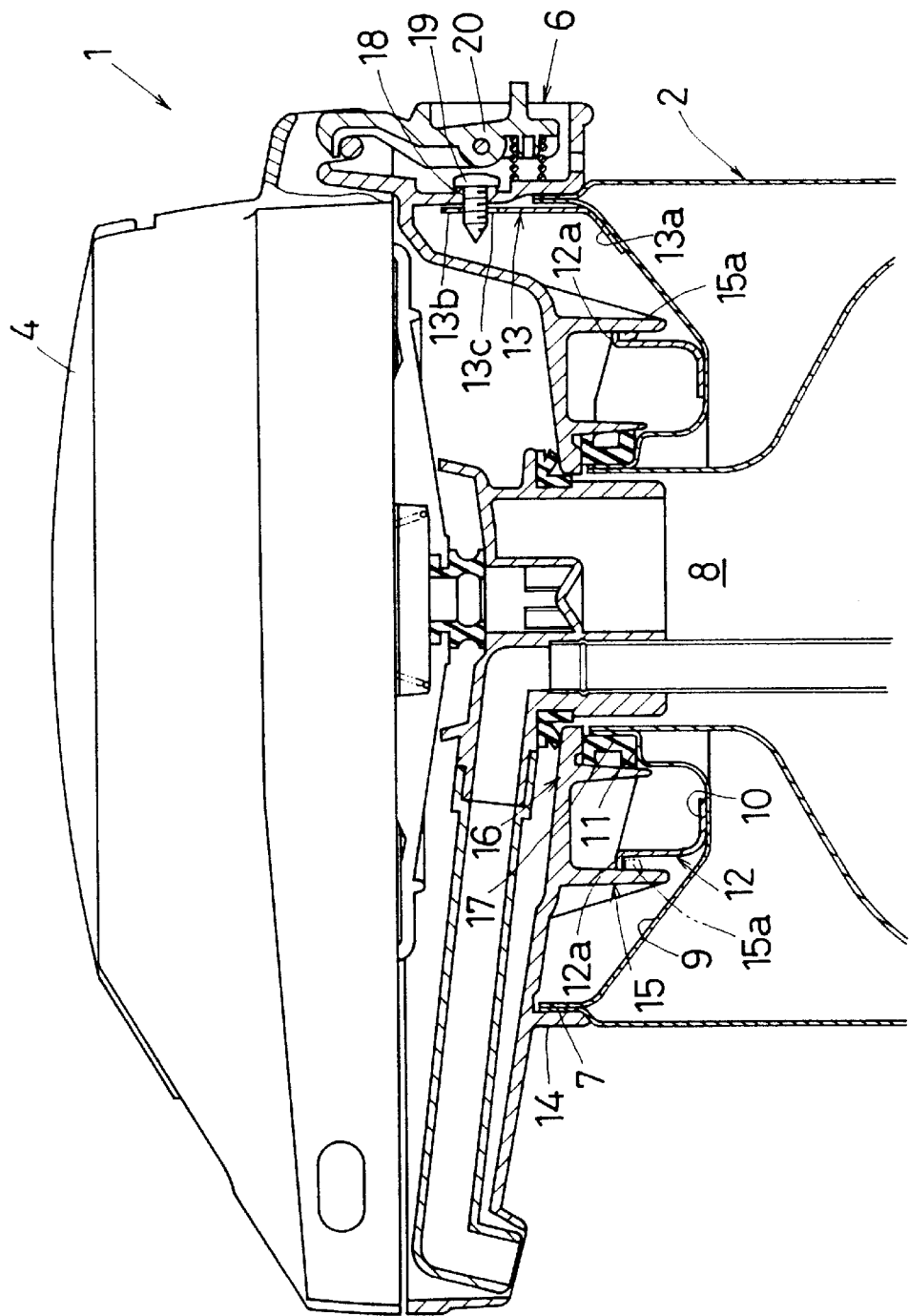
FIG. 1 is a sectional view of the main portion.

This fixing is performed as shown in FIG. 1 in sectional view. Namely, on the outer circumference at the top end of the barrel member 2 is formed a rising portion 7 of a diameter slightly smaller than the outer circumference, while at its inside is formed an opening 8 of prescribed diameter. From said rising portion 7 is formed a sloped portion 9 inclined downward toward the inside, and at its inside is formed a horizontal portion 10, while the portion further at the inside is turned upward through a stepped portion 11, to form said opening 8.

Figure 3:
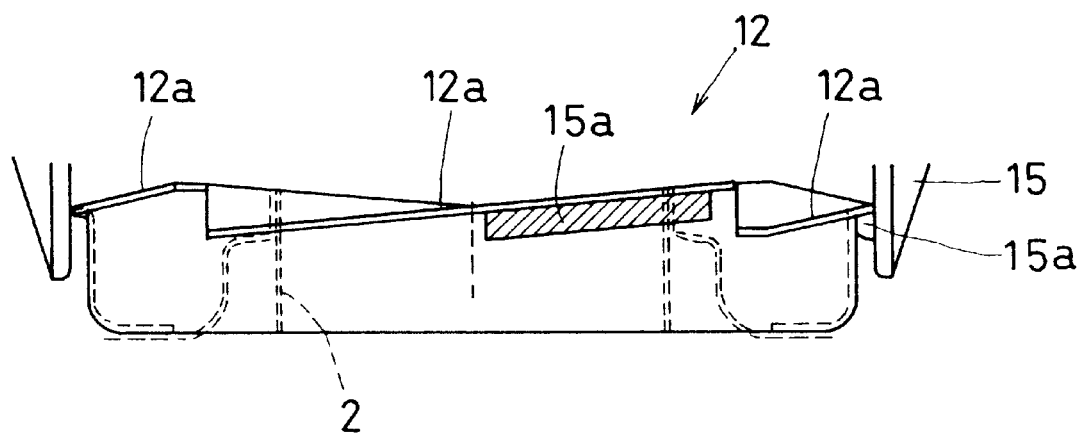
FIG. 3 is a side view of the male screw member.
Figure 4:
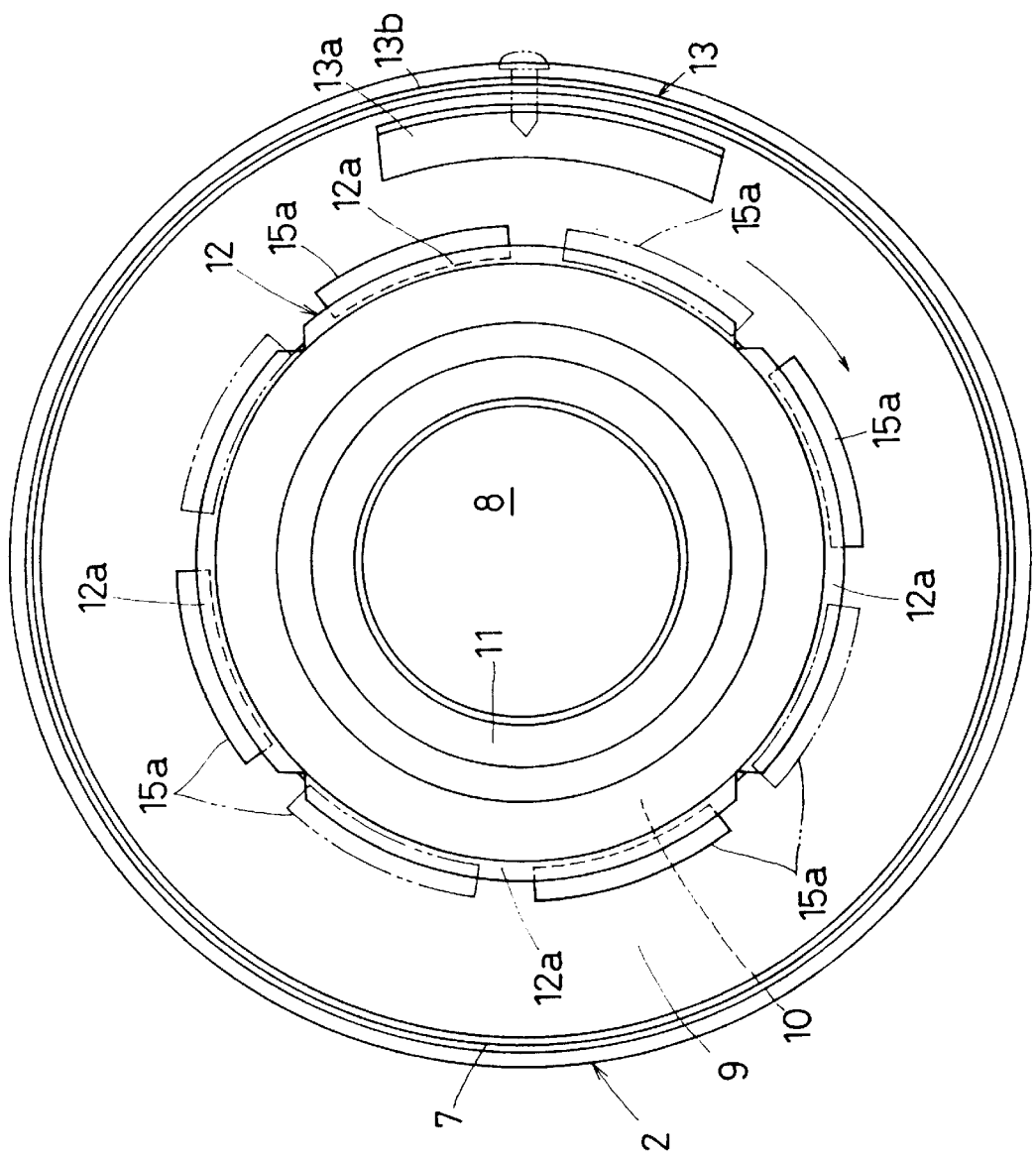
FIG. 4 is a plan view showing the construction of the main portion.

And to said horizontal portion 10 of this barrel member 2 is fixed a male screw member 12 by means of welding, while to said sloped portion 9 is fixed a standing piece 13 by welding. The male screw member 12 has a plate-like shape in front elevation and a doughnut shape in plan view as shown in FIG. 3, FIG. 4, and at its upper edge are formed 4-thread partial screws 12a - - - toward the outside. In the case where either the outside diameter of the male screw member 12 is made equal to the outside diameter of the horizontal portion 10 or the inside diameter of the male screw member 12 is made equal to the inside diameter of the horizontal portion 10, the fixing of the male screw member 12 can be made at the center of the barrel member 2 without eccentricity.

Figure 5:
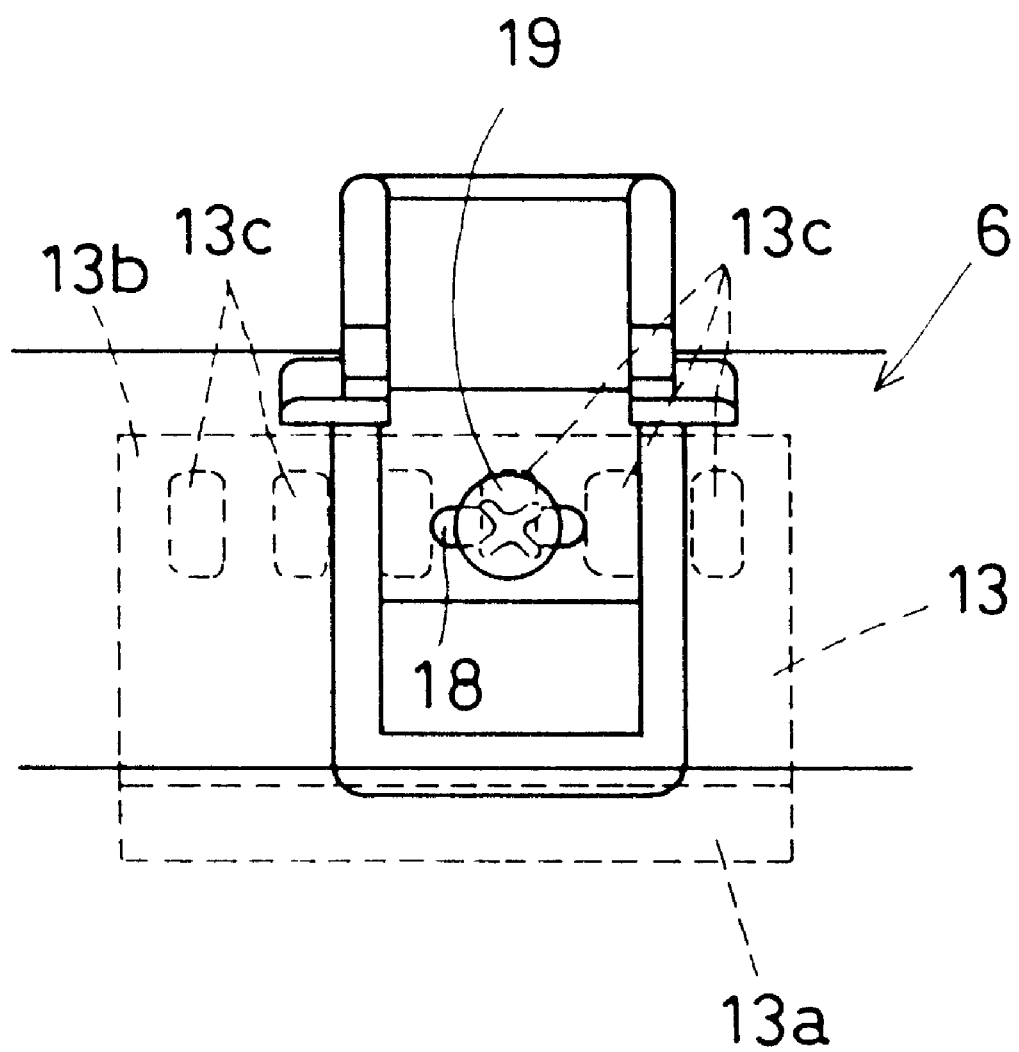
FIG. 5 is a rear view of the main portion.

Moreover, said standing piece 13 having, as shown in FIG. 1, FIG. 4, FIG. 5, a fixed portion 13a along the sloped portion 9, and a screw connecting portion 13b rising vertically from the upper edge thereof is formed at prescribed width, and is curved in the shape of a circular arc at the same curvature as that of the barrel member 2 in plan view. And in the screw connecting portion 13b are formed a plurality of through holes 13c - - - in the shape of slits along the direction of breadth.

Said neck member 6 fixed to such barrel member 2 forms a fitting portion 14 to be fit to said rising portion 7 from outside, a male screw portion 15 to be screw connected with said male screw member 12, and a sealing portion 16 facing the edge at the top of said opening 8. Said male screw portion 15 is formed with an inside diameter about equal to that of the partial screw 12a of the male screw member 12, and on its inner circumferential face are formed 4-thread partial screws 15a - - - as shown in FIG. 3, FIG. 4. This partial screw portion 15a gets in under the partial screw 12a of the male screw member 12 with turning, to be fastened there. The mutual screw fastening between the barrel member 2 and the neck member 6 may be made by forming an integral thread on the barrel member 2, but it will be better to form the male screw portion 15 with an inside diameter about equal to that of the partial screw 12a of the male screw member 12 as described above, because this makes it possible to prevent deflection in the direction of breadth in screwed fastened state.

In said sealing portion 16 is held a packing 17 pressed from above against said stepped portion 11, to thereby obtain an airtight state at the time of screw fastening.

And, on the back face side of the fitting portion 14 of the neck member 6 is formed a through hole 18 long from side to side as shown in FIG. 5, so that a fastening screw 19 may be screw fastened toward the inside in horizontal direction from this through hole 18. As substitute for said fastening screw 19, it will also be all right to form a groove for deformation with reduced diameter on the tip side and use proper fixing member such as lock pin having a protective burr against falling at the tip, a tapping screw, etc. In the case of use of a tapping screw, the through hole 18 in the fitting portion 14 of said neck member 6 may not necessarily be long from side to side, nor is it necessary to form the through hole 13c in the rising piece 7 of the barrel member 2.

20 in the drawings represents an urging bar, provided for the purpose of maintaining the state of fastening in axle of the lid member 14 to the neck member 6, and enabling separation of the lid member 4. Since this urging bar 20 is mounted from behind said fastening screw 19, the fastening screw 19 is concealed, with no fear of any exposure, thus securing a good design feeling.

To fix, in a pot 1 of above-described construction, the barrel member 2 constituted with a metallic vacuum bottle to the neck member 6, the female screw of the neck member 6 is screw connected to the male screw member 12 of the barrel member 2, and then the fastening screw 19 is screw fastened to the through hole 13c in the standing piece 13 of the barrel member 2 through the through hole 18 in the fitting portion 14 of the neck member 6. Since the through hole 18 in the neck member 6 is formed long from side to side and that the through hole 13c in the barrel member 2 is formed in a plural number in the direction of breadth, this fixing can be made easily in a stable state, according to the state of screw fastening between said male screw member 12 and the female screw member 15.

With this pot 1, it becomes possible to maintain a good design feeling without exposure of screw, etc. as in a conventional product, even when the lid member 4 is opened. Moreover, it also solves the problem of hygiene because of the absence of any screw head on the inside.

Furthermore, the double fixing by screw fastening in vertical direction and fixing in horizontal direction provides a solid state of fixing. And, even in case of blowing of the partial screw 15a of the female screw portion 15, the fixing screw 19 works to protect against falling of the barrel member 2.

In addition, the formation of partial screws 12a, 15a on the male screw portion 12 and the female screw portion 15 makes it possible to perform the screw connection between them with a small amount of turning, and facilitates and quickens this operation even with a pot of large diameter. It also enables to keep the orientation of the two members to be fixed about constant.

The screw fastening means in the present invention corresponds to the male screw portion 12 and the female screw portion 15 in said embodiment, while the fixing means corresponds to the standing piece 13 and the fastening screw 19.

What is claimed is:

1. A thermal pot comprising:
   an outer member;
   a vacuum vessel disposed within said outer member;
   a neck member disposed at top of said vacuum vessel and connectable to an upper part of said outer member;
   a lid disposed on said upper part of said outer member;
   screw fastening means disposed between said outer member and said neck member for mutually screw fastening thereof; and
   fixing means for fixing state of screw fastening by said screw fastening means, said fixing means comprising means for adjusting horizontally the positions of said outer member and said neck member with respect to each other; wherein
   said fixing means comprises a standing piece fixed on a top face of said outer member and rising upward, and a fixing screw for screw fastening said neck member from an outer side face horizontally to said standing piece.

2. A thermal pot comprising:
   an outer member;
   a vacuum vessel disposed within said outer member;
   a neck member disposed at top of said vacuum vessel and connectable to an upper part of said outer member;
   a lid disposed on said upper part of said outer member;
   screw fastening means disposed between said outer member and said neck member for mutually screw fastening thereof; and
   fixing means for fixing state of screw fastening by said screw fastening means, said fixing means comprising means for adjusting horizontally the positions of said outer member and said neck member with respect to each other; wherein
   said screw fastening means comprises a male screw member fixed on a top face of said outer member, and a female screw member formed on a bottom face of said neck member; and wherein
   said fixing means comprises a standing piece fixed on said top face of said outer member and rising upward, and a fixing screw for fastening said neck member from and outer side face horizontally to said standing piece.

3. A thermal pot comprising:

an outer member;

a vacuum vessel disposed within said outer member;

a neck member disposed at top of said vacuum vessel and connectable to an upper part of said outer member;

a lid disposed on said upper part of said outer member;

screw fastening means disposed between said outer member and said neck member for mutually screw fastening thereof, said screw fastening means comprising a male screw fastening means fixed on a top face of said outer member and a female screw fastening means formed on a bottom face of said neck member; and fixing means for fixing the state of screw fastening by said screw fastening means, said fixing means comprising a standing piece fixed on said top face of said outer member and rising upward, and a fixing screw for screw fastening said neck member from an outer side face horizontally to said standing piece thereby to adjust horizontally the position of said outer member and said neck member with respect to each other.

* * * * *